US012327513B2

(12) United States Patent
Yoon

(10) Patent No.: US 12,327,513 B2

(45) Date of Patent: Jun. 10, 2025

(54) DISPLAY DEVICE

(71) Applicant: Samsung Display Co., LTD., Yongin-si (KR)

(72) Inventor: Hyun-Sik Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/511,101

(22) Filed: Nov. 16, 2023

(65) Prior Publication Data

US 2024/0221598 A1 Jul. 4, 2024

(30) Foreign Application Priority Data

Jan. 2, 2023 (KR) ........................ 10-2023-0000119

(51) Int. Cl.

*G09G 3/20* (2006.01)
*G06N 3/02* (2006.01)
*G09G 3/3233* (2016.01)

(52) U.S. Cl.

CPC ......... *G09G 3/2096* (2013.01); *G09G 3/3233* (2013.01); *G09G 2300/0819* (2013.01); *G09G 2300/0842* (2013.01); *G09G 2320/041* (2013.01); *G09G 2320/045* (2013.01); *G09G 2320/0626* (2013.01); *G09G 2320/0666* (2013.01); *G09G 2360/00* (2013.01)

(58) Field of Classification Search

None

See application file for complete search history.

(56) References Cited

U.S. PATENT DOCUMENTS

| | | | | |
|---|---|---|---|---|
| 7,675,490 | B2 | 3/2010 | Cok et al. | |
| 2007/0139406 | A1* | 6/2007 | Ozawa | G09G 3/3233 345/211 |
| 2011/0126029 | A1* | 5/2011 | Jeansonne | G09G 5/10 713/300 |
| 2013/0169695 | A1* | 7/2013 | Hyeon | G09G 3/3208 345/82 |
| 2015/0243213 | A1* | 8/2015 | Ryu | G09G 3/3225 345/212 |
| 2016/0171955 | A1* | 6/2016 | Yata | G09G 3/3607 345/601 |
| 2016/0343293 | A1* | 11/2016 | Kim | G09G 3/20 |
| 2017/0097759 | A1* | 4/2017 | Takazawa | G06F 3/04847 |
| 2019/0206305 | A1* | 7/2019 | Lee | G09G 3/2003 |
| 2019/0206364 | A1* | 7/2019 | Jeong | G09G 3/2096 |
| 2021/0174715 | A1* | 6/2021 | Holloway | G06Q 30/0277 |
| 2021/0193016 | A1* | 6/2021 | Pyun | G09G 3/3225 |
| 2021/0210000 | A1* | 7/2021 | Lee | G09G 3/32 |
| 2022/0366857 | A1* | 11/2022 | An | G09G 3/3291 |

(Continued)

FOREIGN PATENT DOCUMENTS

KR 1020200068321 A 6/2020

*Primary Examiner* — Sepehr Azari

(74) *Attorney, Agent, or Firm* — CANTOR COLBURN LLP

(57) ABSTRACT

A display device includes a display panel including a pixel, a data driver which provides a data voltage to the pixel, an artificial intelligence model which receives luminance efficiency for each of colors in each of panel blocks of the display panel and predicts a power current applied to the display panel, and a timing controller which controls the data driver and provides the luminance efficiency for each of the colors to the artificial intelligence model.

19 Claims, 9 Drawing Sheets

(56) References Cited

U.S. PATENT DOCUMENTS

| | | | | |
|---|---|---|---|---|
| 2022/0383789 | A1* | 12/2022 | Ahn | G09G 3/20 |
| 2022/0415256 | A1* | 12/2022 | Hoon Lee | G09G 3/342 |
| 2023/0206860 | A1* | 6/2023 | Lee | B60K 35/29 |

* cited by examiner

DISPLAY DEVICE

This application claims priority to Korean Patent Application No. 10-2023-0000119, filed on Jan. 2, 2023, and all the benefits accruing therefrom under 35 U.S.C. § 119, the content of which in its entirety is herein incorporated by reference.

BACKGROUND

1. Field

Embodiments of the disclosure relate to a display device. More particularly, embodiments of the disclosure relate to a display device capable of predicting a power current.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals respectively to the gate lines, the data driver may provide data voltages to the data lines, and the timing controller may control the gate driver and the data driver.

SUMMARY

A luminance of a displayed image may vary according to a power current applied to the display panel. Therefore, in order to control the luminance, the power current may be sensed. However, when the display device includes a current sensor which senses a power current, a cost for manufacturing the display device may be increased due to the current sensor, and when a shortage occurs in the current sensor, replacement of the current sensor may be desired.

A feature of the disclosure is to provide a display device capable of predicting a power current.

However, the feature of the disclosure is not limited thereto. Thus, the feature of the disclosure may be extended without departing from the spirit and the scope of the disclosure.

In an embodiment of the disclosure, a display device may include a display panel including a pixel, a data driver which provides a data voltage to the pixel, an artificial intelligence model which receives luminance efficiency for each of colors in each of panel blocks of the display panel and predicts a power current applied to the display panel, and a timing controller which controls the data driver and provides the luminance efficiency for each of the colors to the artificial intelligence model.

In an embodiment, the artificial intelligence model may receive a load of input image data in each of the panel blocks and predict the power current.

In an embodiment, the artificial intelligence model may receive a position of each of the panel blocks corresponding to the load and predict the power current.

In an embodiment, the artificial intelligence model may receive a temperature of the display panel and predict the power current.

In an embodiment, the artificial intelligence model may receive a deterioration amount of the pixel and predict the power current.

In an embodiment, the timing controller may determine the deterioration amount of the pixel by sensing an electrical characteristic of the pixel.

In an embodiment, the timing controller may determine the deterioration amount of the pixel by comparing a sensing current in an initial sensing operation with a sensing current in a current sensing operation.

In an embodiment, the deterioration amount of the pixel may be updated.

In an embodiment of the disclosure, a display device may include a display panel including a pixel, a data driver which provides a data voltage to the pixel, an artificial intelligence model which receives a temperature of the display panel and predicts a power current applied to the display panel, and a timing controller which controls the data driver and provides the temperature of the display panel to the artificial intelligence model.

In an embodiment, the artificial intelligence model may receive a load of input image data in each of panel blocks of the display panel and predict the power current.

In an embodiment, the artificial intelligence model may receive a position of each of the panel blocks corresponding to the load and predict the power current.

In an embodiment, the artificial intelligence model may receive a deterioration amount of the pixel and predict the power current.

In an embodiment, the timing controller may determine the deterioration amount of the pixel by sensing an electrical characteristic of the pixel.

In an embodiment, the timing controller may determine the deterioration amount of the pixel by comparing a sensing current in an initial sensing operation with a sensing current in a current sensing operation.

In an embodiment, the deterioration amount of the pixel may be updated.

In an embodiment of the disclosure, a display device may include a display panel including a pixel, a data driver which provides a data voltage to the pixel, an artificial intelligence model which receives a deterioration amount of the pixel and predicts a power current applied to the display panel, and a timing controller which controls the data driver and provides the deterioration amount of the pixel to the artificial intelligence model.

In an embodiment, the timing controller may determine the deterioration amount of the pixel by sensing an electrical characteristic of the pixel.

In an embodiment, the timing controller may determine the deterioration amount of the pixel by comparing a sensing current in an initial sensing operation with a sensing current in a current sensing operation.

In an embodiment, the deterioration amount of the pixel may be updated.

In an embodiment, the artificial intelligence model may receive a load of input image data in each of panel blocks of the display panel and a position of each of the panel blocks corresponding to the load and predict the power current.

Therefore, a display device in embodiments may predict a power current without a current sensor which senses the power current by including an artificial intelligence model which receives at least one of luminance efficiency for each of colors in each of panel blocks, a temperature of a display panel, a deterioration amount of a pixel, a load of input image data in each of the panel blocks, and a position of each of the panel blocks corresponding to the load to predict a power current.

However, the effects of the disclosure are not limited thereto. Thus, the effects of the disclosure may be extended without departing from the spirit and the scope of the disclosure.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
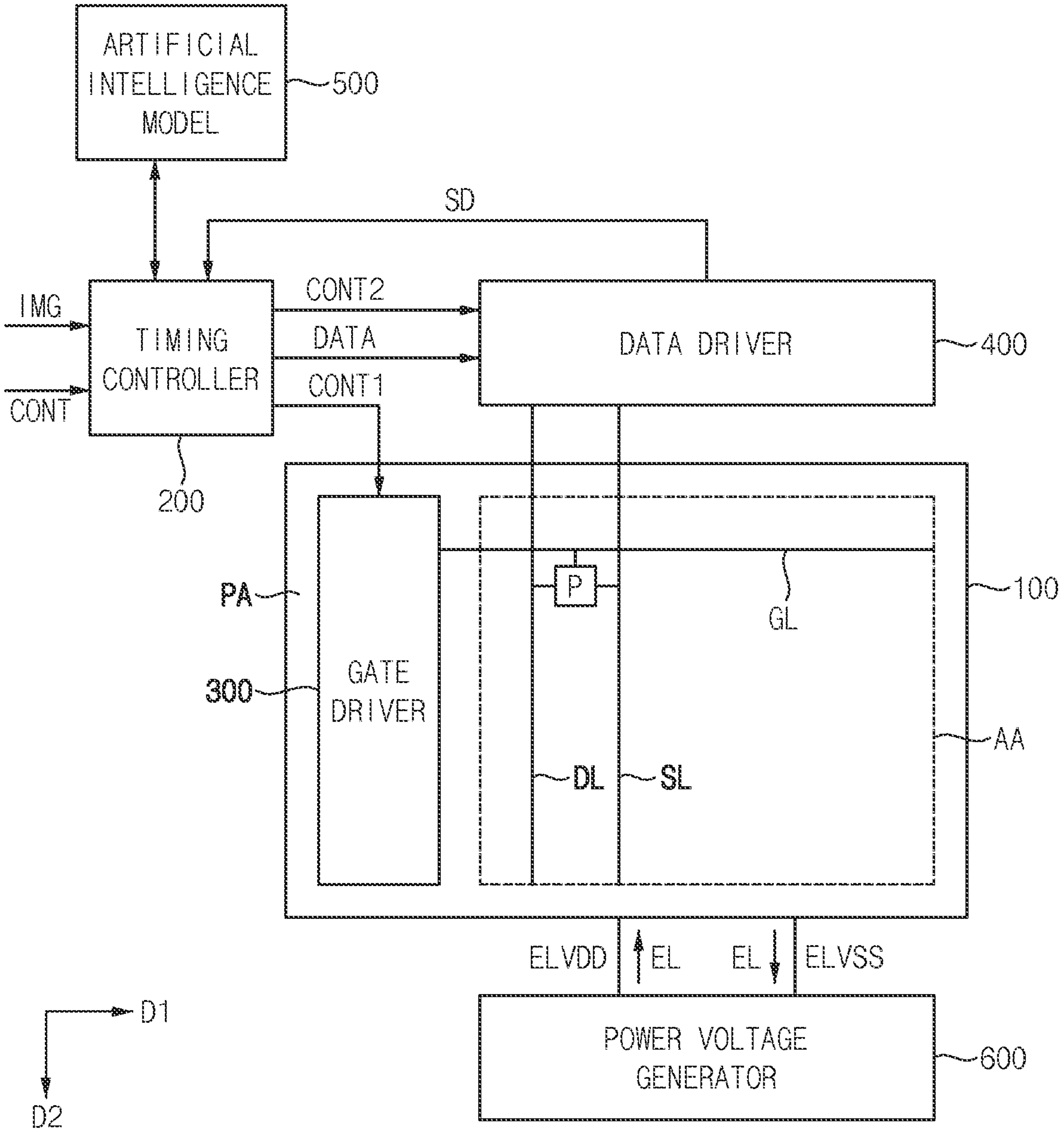
FIG. 1 is a block diagram showing an embodiment of a display device according to the disclosure.

Hereinafter, embodiments of the disclosure will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

The term such as "artificial intelligence model" as used herein may be intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram showing an embodiment of a display device according to the disclosure.

Referring to FIG. 1, a display device may include a display panel 100, a timing controller 200, a gate driver 300, a data driver 400, an artificial intelligence model 500, and a power voltage generator 600. In an embodiment, the timing controller 200 and the data driver 400 may be integrated on a single chip.

In an embodiment, the artificial intelligence model 500 may be stored in a non-volatile memory device outside the timing controller 200. In an embodiment, the artificial intelligence model 500 may be included in the timing controller 200. In an embodiment, the artificial intelligence model 500 may be stored in a memory inside the timing controller 200, for example. The artificial intelligence model 500 will be described in detail below.

The display panel 100 may include a display part AA which displays an image, and a peripheral part PA that is adjacent to the display part AA. In an embodiment, the gate driver 300 may be disposed (e.g., mounted) on the peripheral part PA.

The display panel 100 may include a plurality of gate lines GL, a plurality of data lines DL, a plurality of sensing lines SL, and a plurality of pixels P electrically connected to the gate lines GL, data lines DL, and sensing lines SL. The gate lines GL may extend in a first direction D1, and the data lines DL and the sensing lines SL may extend in a second direction D2 intersecting the first direction D1.

The timing controller 200 may receive input image data IMG and an input control signal CONT from a main processor (e.g., a graphic processing unit ("GPU"), etc.). In an embodiment, the input image data IMG may include red image data, green image data, and blue image data, for example. In an embodiment, the input image data IMG may further include white image data. In another embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate gate signals for driving the gate lines GL in response to the first control signal CONT1 received from the timing controller 200. In an embodiment, the gate signals may include a scan signal (SC of FIG. 2) and a sensing signal (SS of FIG. 2), for example. The gate driver 300 may output the gate signals to the gate lines GL. In an embodiment, the gate driver 300 may sequentially output the gate signals to the gate lines GL, for example.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data line DL.

The data driver 400 may receive a signal of the sensing line SL to output sensing data SD. The timing controller 200 may sense electrical characteristics of the pixels P (e.g., sense a threshold voltage and a mobility characteristic of a driving transistor (DT of FIG. 2) of each of the pixels P, a capacitance of a light-emitting element (EE of FIG. 2), or the like) based on the sensing data SD. The timing controller 200 may compensate for the input image data IMG based on the sensing data SD.

The power voltage generator 600 may output a first power voltage ELVDD and a second power voltage ELVSS to the display panel 100. When the pixels P are driven, a power current EL may flow along power lines from which the first power voltage ELVDD and the second power voltage ELVSS are output. The artificial intelligence model 500 may predict the power current EL applied to the display panel 100 to generate a prediction current (PC of FIG. 6).

Figure 2:
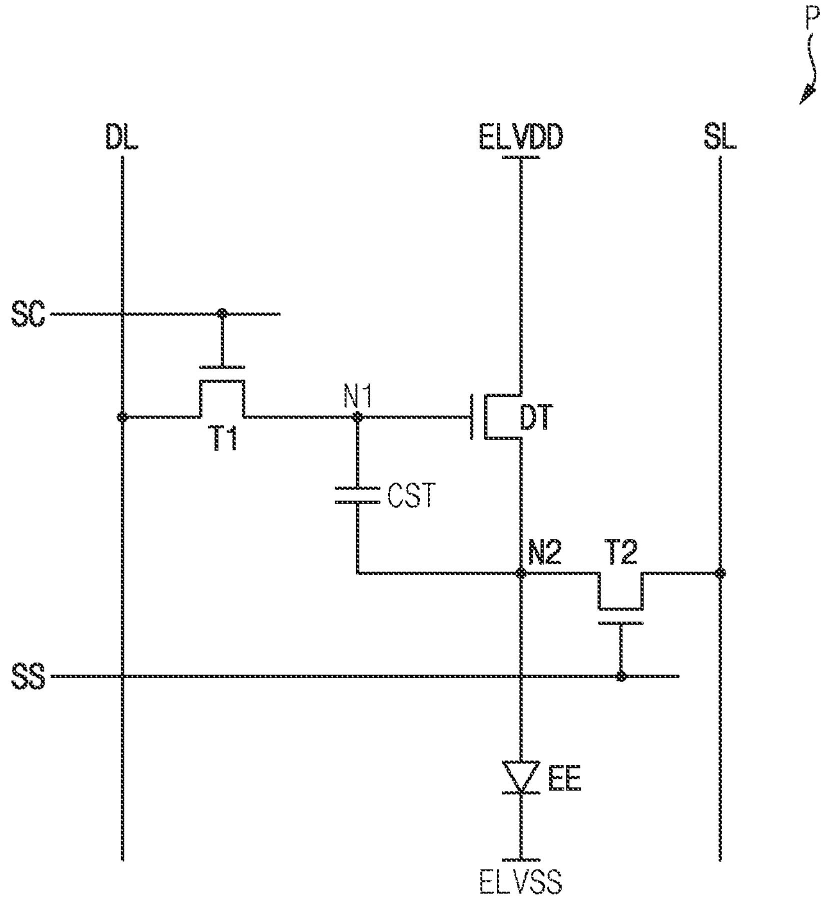
FIG. 2 is a circuit diagram showing one embodiment of pixels of the display device of FIG. 1.
Figure 3:
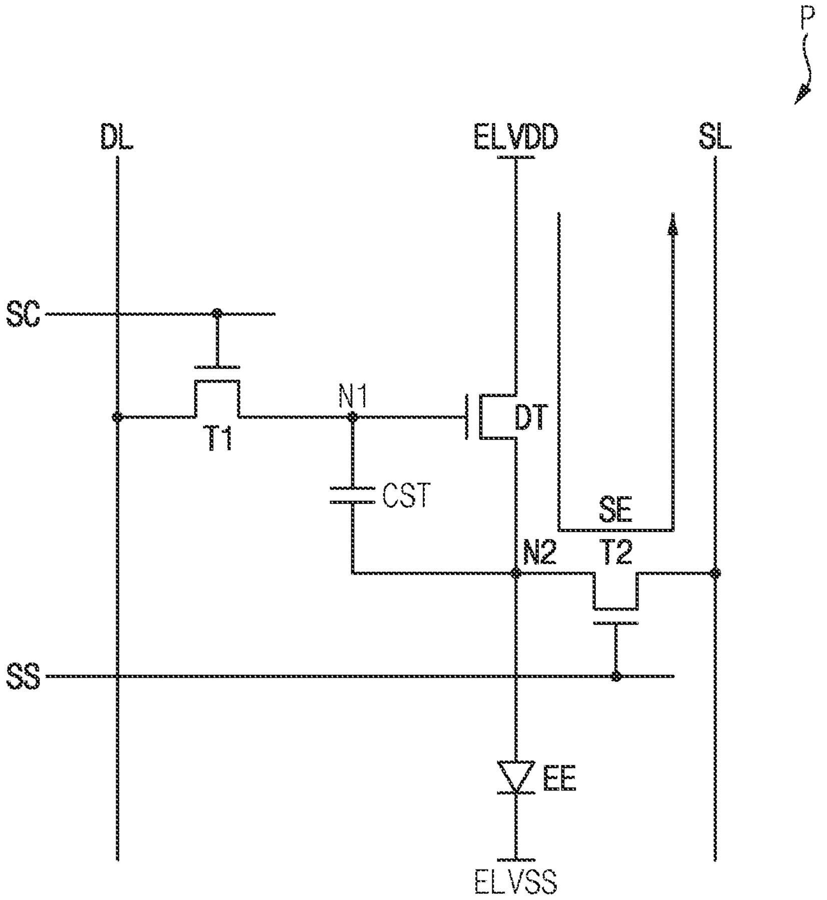
FIG. 3 is a circuit diagram showing one example in which a sensing current flows through the pixels of the display device of FIG. 1.
Figure 4:
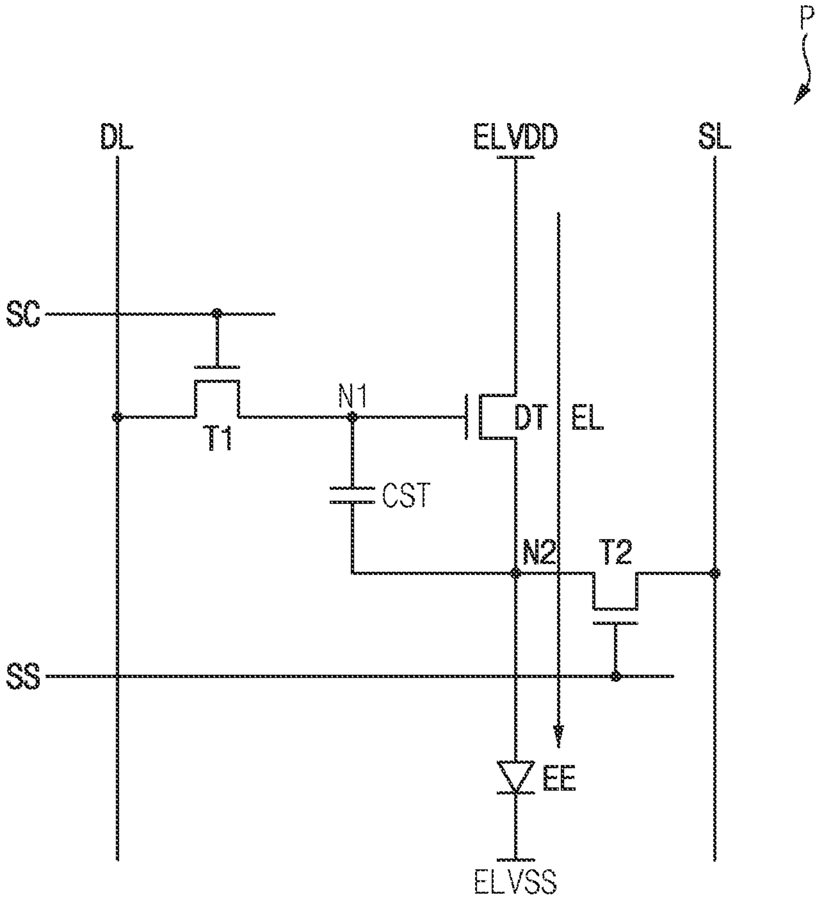
FIG. 4 is a circuit diagram showing one example in which a power current flows through the pixels of the display device of FIG. 1.

FIG. 2 is a circuit diagram showing one embodiment of pixels P of the display device of FIG. 1, FIG. 3 is a circuit diagram showing one example in which a sensing current SE flows through the pixels P of the display device of FIG. 1, and FIG. 4 is a circuit diagram showing one example in which a power current EL flows through the pixels P of the display device of FIG. 1.

Referring to FIGS. 1 to 4, the pixel P may include a driving transistor DT including a control electrode connected to a first node N1, a first electrode which receives a first power voltage ELVDD (e.g., a relatively high power voltage), and a second electrode connected to a second node N2, a first transistor T1 including a control electrode which receives a scan signal SC, a first electrode which receives a data voltage, and a second electrode connected to the first node N1, a second transistor T2 including a control electrode which receives a sensing signal SS, a first electrode connected to a sensing line SL, and a second electrode connected to the second node N2, a storage capacitor CST including a first electrode connected to the first node N1, and a second electrode connected to the second node N2, and a light-emitting element EE including a first electrode connected to the second node N2, and a second electrode which receives a second power voltage ELVSS (e.g., a relatively low power voltage). In an embodiment, one of the first electrode and the second electrode may be a source electrode, and a remaining one of the first electrode and the second electrode may be a drain electrode based on a type of the transistor, but the disclosure is not limited thereto.

In this case, the second power voltage ELVSS may be lower than the first power voltage ELVDD. In an embodiment, the light-emitting element EE may be an organic light-emitting diode, for example.

During a sensing operation, the first transistor T1 may apply a reference voltage to the first node N1 in response to the scan signal SC, and the second transistor T2 may apply an initialization voltage to the second node N2 in response to the sensing signal SS. As shown in FIG. 3, a sensing current SE corresponding to a voltage of the first node N1 may flow through the driving transistor DT. The second transistor T2 may apply a signal of the second node N2 (e.g., the sensing current SE) to the sensing line SL. The data driver 400 may receive a signal of the sensing line SL (i.e., the signal of the second node N2), and output the sensing data SD.

The timing controller 200 may sense an electrical characteristic of the pixel P based on the sensing data SD. In an embodiment, the electrical characteristic of the pixel P may be an electrical characteristic of the driving transistor DT. In an embodiment, the electrical characteristic of the driving transistor DT may be a threshold voltage of the driving transistor DT, for example. In an embodiment, the electrical characteristic of the driving transistor DT may be mobility of the driving transistor DT, for example. In an embodiment, the electrical characteristic of the pixel P may be an electrical characteristic of the light-emitting element EE. In an embodiment, the electrical characteristic of the light-emitting element EE may be a capacitance of the light-emitting element EE, for example.

During a driving operation, the second transistor T2 may apply the initialization voltage to the second node N2 in response to the sensing signal SS. Accordingly, the first electrode (i.e., an anode electrode) of the light-emitting element EE may be initialized. The data driver 400 may apply the data voltage to the data line DL. The first transistor T1 may apply the data voltage to the first node N1 in response to the scan signal SC. The data voltage applied to the first node N1 may be written in the storage capacitor CST. As shown in FIG. 4, the power current EL corresponding to the voltage of the first node N1 may flow through the driving transistor DT. The power current may be applied to the light-emitting element EE, and the light-emitting element EE may emit a light with a luminance according to the power current.

Figure 5:
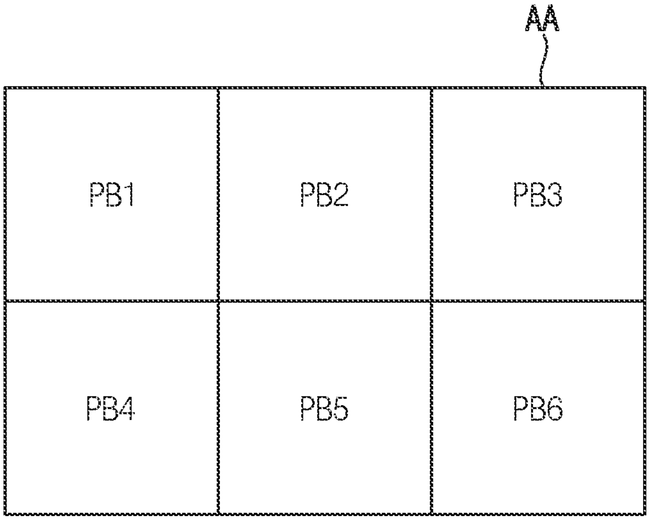
FIG. 5 is a view showing one embodiment of a display part of FIG. 1.

FIG. 5 is a view showing one embodiment of a display part AA of FIG. 1.

Referring to FIG. 5, the display part AA may include a plurality of panel blocks PB1, PB2, PB3, PB4, PB5, and PB6. In an embodiment, each of the panel blocks PB1, PB2, PB3, PB4, PB5, and PB6 may include a predetermined number of pixels P, for example.

Although six panel blocks PB1, PB2, PB3, PB4, PB5, and PB6 have been illustrated in the illustrated embodiment, the disclosure is not limited to the number of panel blocks PB1, PB2, PB3, PB4, PB5, and PB6.

Figure 6:
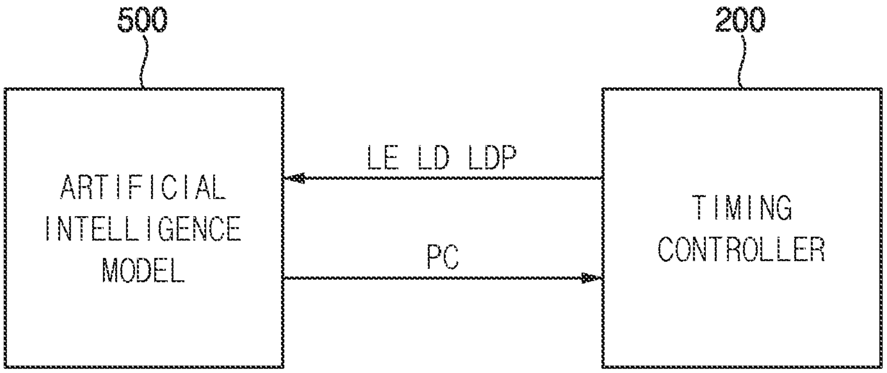
FIG. 6 is a block diagram showing one embodiment of a timing controller and an artificial intelligence model of FIG. 1.

FIG. 6 is a block diagram showing one embodiment of a timing controller 200 and an artificial intelligence model 500 of FIG. 1.

Referring to FIGS. 1 and 6, the artificial intelligence model 500 may receive luminance efficiency LE for each of colors in each of the panel blocks PB1, PB2, PB3, PB4, PB5, and PB6 of the display panel 100, a load LD of the input image data IMG in each of the panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate a prediction current PC, and output the prediction current PC to the timing controller 200. The timing controller 200 may control a luminance based on the prediction current PC.

The load LD may be normalized to have a value from 0% to 100%. In an embodiment, when a full-white image is displayed on a first panel block PB1, the load LD corresponding to the first panel block PB1 may be 100%, for example. In an embodiment, when a full-black image is displayed on the first panel block PB1, the load LD corresponding to the first panel block PB1 may be 0%, for example.

Due to process distribution or the like, the power current EL flowing from the same load LD to each of the panel blocks PB1, PB2, PB3, PB4, PB5, and PB6 may vary. Therefore, the artificial intelligence model 500 may be trained to consider the load LD of the input image data IMG in each of the panel blocks PB1, PB2, PB3, PB4, PB5, and PB6 and the position LDP of each of the panel blocks PB1, PB2, PB3, PB4, PB5, and PB6 corresponding to the load LD.

In an embodiment, the artificial intelligence model 500 may receive a load LD (i.e., a position LDP) of the first panel block PB1, a load LD (i.e., a position LDP) of a second panel block PB2, a load LD (i.e., a position LDP) of a third panel block PB3, a load LD (i.e., a position LDP) of a fourth panel block PB4, a load LD (i.e., a position LDP) of a fifth panel block PB5, and a load LD (i.e., a position LDP) of a sixth panel block PB6, for example.

The luminance efficiency LE may be a ratio of a luminance of each of the panel blocks PB1, PB2, PB3, PB4, PB5, and PB6 to the power current EL flowing through each of the panel blocks PB1, PB2, PB3, PB4, PB5, and PB6. In addition, the luminance efficiency LE may vary for each of the colors. Further, the luminance efficiency LE may vary for each load LD of each of the colors. In other words, the luminance efficiency LE may be a value for the color and the load LD of each of the colors.

In this case, the load LD of each of the colors may be the load LD of the input image data IMG for displaying each of the colors.

In an embodiment, it is to be assumed that when a load LD of a red color of about 10% is displayed on the first panel block PB1, the power current EL flowing through the first panel block PB1 is about 10 milliamperes (mA), and the luminance of the first panel block PB1 is 10 nits, for example. In this case, the luminance efficiency LE of the first panel block PB1 corresponding to the red color and the load LD of about 10% may be 1.

In an embodiment, it is to be assumed that the pixels P display an image in a combination of a red color, a green color, and a blue color, the load LD of the first panel block PB1 is about 30% when only the red color is displayed on the first panel block PB1 at a maximum gray level, the load LD of the first panel block PB1 is about 40% when only the green color is displayed on the first panel block PB1 at the maximum gray level, and the load LD is about 30% when only the blue color is displayed on the first panel block PB1 at the maximum gray level, for example. In this case, when a full-white image is displayed on the first panel block PB1, the load LD of the red color may be about 30%, the load LD of the green color may be about 40%, and the load LD of the blue color may be about 30%. Therefore, the artificial intelligence model 500 may receive the luminance efficiency LE of the first panel block PB1 corresponding to the red color and a load LD of about 30%, the luminance efficiency LE of the first panel block PB1 corresponding to the green color and a load LD of about 40%, and the luminance efficiency LE of the first panel block PB1 corresponding to the blue color and a load LD of about 30%. This will be similarly applied to the second to sixth panel blocks PB2, PB3, PB4, PB5, and PB6.

The luminance efficiency LE may vary for each of the panel blocks PB1, PB2, PB3, PB4, PB5, and PB6, vary for each of the colors, and vary for each of the loads LD. Therefore, the artificial intelligence model 500 may be trained to consider the luminance efficiency LE.

The artificial intelligence model 500 may be a model trained from measurement values of the power current EL according to the luminance efficiency LE for each of the colors in each of the panel blocks PB1, PB2, PB3, PB4, PB5, and PB6, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD. In an embodiment, the artificial intelligence model 500 may be an artificial neural network model, for example.

Figure 7:
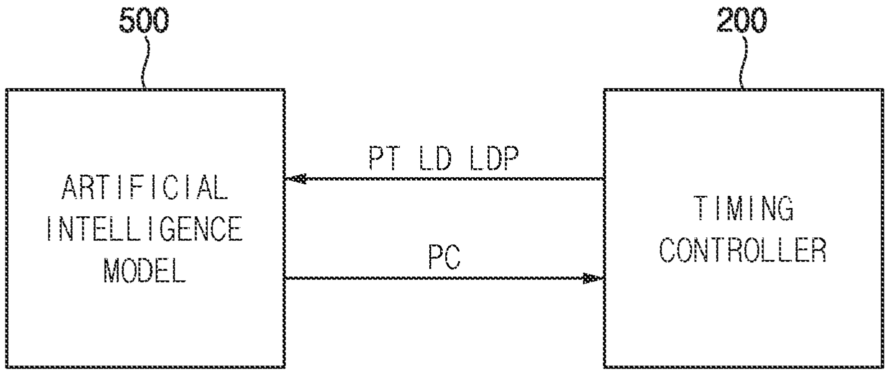
FIG. 7 is a block diagram showing an embodiment of a timing controller and an artificial intelligence model of a display device according to the disclosure.

FIG. 7 is a block diagram showing an embodiment of a timing controller 200 and an artificial intelligence model 500 of a display device according to the disclosure.

Since a display device in the illustrated embodiments has a configuration that is substantially identical to the configuration of the display device of FIG. 1 except that a temperature PT of the display panel 100 is received instead of the luminance efficiency LE, the same reference numerals and reference signs will be used for the same or similar components, and redundant descriptions will be omitted.

Referring to FIGS. 1, 2, and 7, an artificial intelligence model 500 may receive a temperature PT of the display panel 100, a load LD of the input image data IMG in each of panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate a prediction current PC, and output the prediction current PC to the timing controller 200. The timing controller 200 may control a luminance based on the prediction current PC.

The temperature PT of the display panel 100 may be measured by a temperature sensor. In an embodiment, the temperature sensor may be integrated into the display panel 100. In an embodiment, the temperature sensor may be integrated into the timing controller 200.

Electrical characteristics of the pixels P may vary according to the temperature PT of the display panel 100. In other words, the power current EL flowing through each of the panel blocks PB1, PB2, PB3, PB4, PB5, and PB6 may vary according to the temperature PT. Therefore, the artificial intelligence model 500 may be trained to consider the temperature PT of the display panel 100.

The artificial intelligence model 500 may be a model trained from measurement values of the power current EL according to the temperature PT of the display panel 100, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD. In an embodiment, the artificial intelligence model 500 may be an artificial neural network model, for example.

Figure 8:
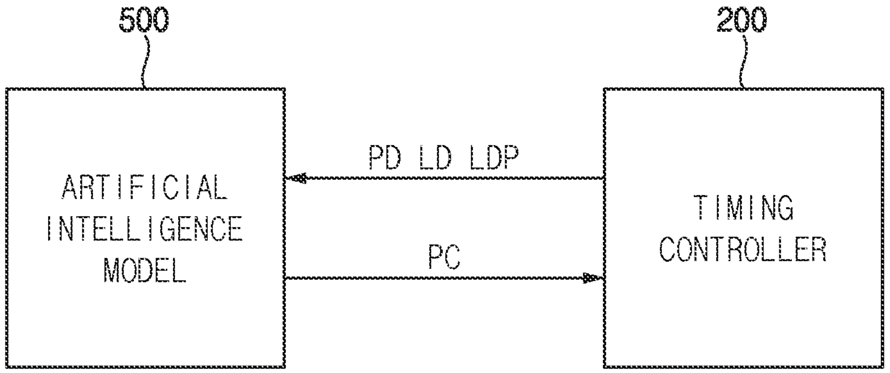
FIG. 8 is a block diagram showing an embodiment of a timing controller and an artificial intelligence model of a display device according to the disclosure.

FIG. 8 is a block diagram showing an embodiment of a timing controller 200 and an artificial intelligence model 500 of a display device according to the disclosure.

Since a display device in the illustrated embodiments has a configuration that is substantially identical to the configuration of the display device of FIG. 1 except that a deterioration amount PD of the pixel P is received instead of the luminance efficiency LE, the same reference numerals and reference signs will be used for the same or similar components, and redundant descriptions will be omitted.

Referring to FIGS. 1 to 3 and 8, an artificial intelligence model 500 may receive a deterioration amount PD of the pixel P, a load LD of the input image data IMG in each of panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate a prediction current PC, and output the prediction current PC to the timing controller 200. The timing controller 200 may control a luminance based on the prediction current PC.

In an embodiment, the timing controller 200 may determine the deterioration amount PD of the pixel P by sensing an electrical characteristic of the pixel P. In an embodiment, the timing controller 200 may determine a variation of the threshold voltage of the driving transistor DT as the deterioration amount PD of the pixel P, for example. In an embodiment, the timing controller 200 may determine a variation of the mobility of the driving transistor DT as the deterioration amount PD of the pixel P, for example. In an embodiment, the timing controller 200 may determine a variation of the capacitance of the light-emitting element EE as the deterioration amount PD of the pixel P, for example.

In an embodiment, the timing controller 200 may determine the deterioration amount PD of the pixel P by comparing a sensing current SE in an initial sensing operation with a sensing current SE in a current (or present) sensing operation. In an embodiment, the timing controller 200 may determine a difference between the sensing current SE in the initial sensing operation and the sensing current SE in the current sensing operation as the deterioration amount PD of the pixel P, for example.

The initial sensing operation may be a sensing operation that has been performed at the very first. In other words, the initial sensing operation may be a sensing operation performed in a state where deterioration of the pixels P has rarely occurred. In other words, the timing controller 200 may determine the deterioration amount PD of the pixels P by comparing the sensing current SE in the state where the deterioration of the pixels P has rarely occurred with the sensing current SE in a current (or present) state.

The deterioration amount PD of the pixel P may be updated. The display device may perform the sensing operation at regular intervals. Therefore, the timing controller 200 may update the deterioration amount PD of the pixel P.

Electrical characteristics of the pixels P may vary according to the deterioration amount PD of the pixel P. In other words, the power current EL flowing through each of the panel blocks PB1, PB2, PB3, PB4, PB5, and PB6 may vary according to the deterioration amount PD of the pixel P. Therefore, the artificial intelligence model 500 may be trained to consider the deterioration amount PD of the pixel P.

The artificial intelligence model 500 may be a model trained from measurement values of the power current EL according to the deterioration amount PD of the pixel P, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD. In an embodiment, the artificial intelligence model 500 may be an artificial neural network model, for example.

Figure 9:
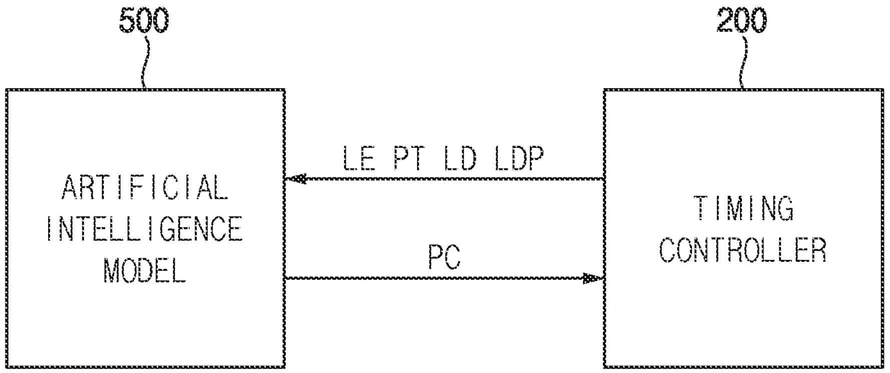
FIG. 9 is a block diagram showing an embodiment of a timing controller and an artificial intelligence model of a display device according to the disclosure.

FIG. 9 is a block diagram showing an embodiment of a timing controller 200 and an artificial intelligence model 500 of a display device according to the disclosure.

Since a display device in the illustrated embodiments has a configuration that is substantially identical to the configuration of the display device of FIG. 1 except that a temperature PT of the display panel 100 is received, the same reference numerals and reference signs will be used for the same or similar components, and redundant descriptions will be omitted.

Referring to FIGS. 1 and 9, an artificial intelligence model 500 may receive luminance efficiency LE for each of colors in each of panel blocks PB1, PB2, PB3, PB4, PB5, and PB6 of the display panel 100, a temperature PT of the display panel 100, a load LD of the input image data IMG in each of the panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate the prediction current PC, and output the prediction current PC to the timing controller 200. The timing controller 200 may control a luminance based on the prediction current PC.

The artificial intelligence model 500 may be a model trained from measurement values of the power current EL according to the luminance efficiency LE for each of the colors in each of the panel blocks PB1, PB2, PB3, PB4, PB5, and PB6 of the display panel 100, the temperature PT of the display panel 100, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD.

Figure 10:
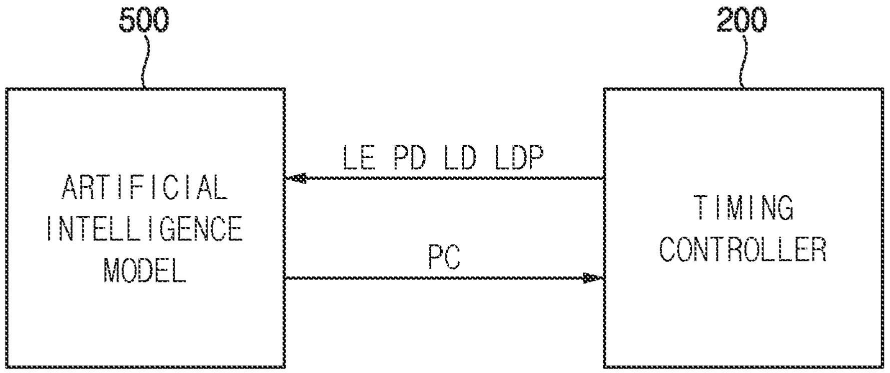
FIG. 10 is a block diagram showing an embodiment of a timing controller and an artificial intelligence model of a display device according to the disclosure.

FIG. 10 is a block diagram showing an embodiment of a timing controller 200 and an artificial intelligence model 500 of a display device according to the disclosure.

Since a display device in the illustrated embodiments has a configuration that is substantially identical to the configuration of the display device of FIG. 1 except that a deterioration amount PD of the pixel P is received, the same reference numerals and reference signs will be used for the same or similar components, and redundant descriptions will be omitted.

Referring to FIGS. 1 and 10, an artificial intelligence model 500 may receive luminance efficiency LE for each of colors in each of panel blocks PB1, PB2, PB3, PB4, PB5, and PB6 of the display panel 100, a deterioration amount PD of the pixel P, a load LD of the input image data IMG in each of the panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate the prediction current PC, and output the prediction current PC to the timing controller 200. The timing controller 200 may control a luminance based on the prediction current PC.

The artificial intelligence model 500 may be a model trained from measurement values of the power current EL according to the luminance efficiency LE for each of the colors in each of the panel blocks PB1, PB2, PB3, PB4, PB5, and PB6 of the display panel 100, the deterioration amount PD of the pixel P, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD.

Figure 11:
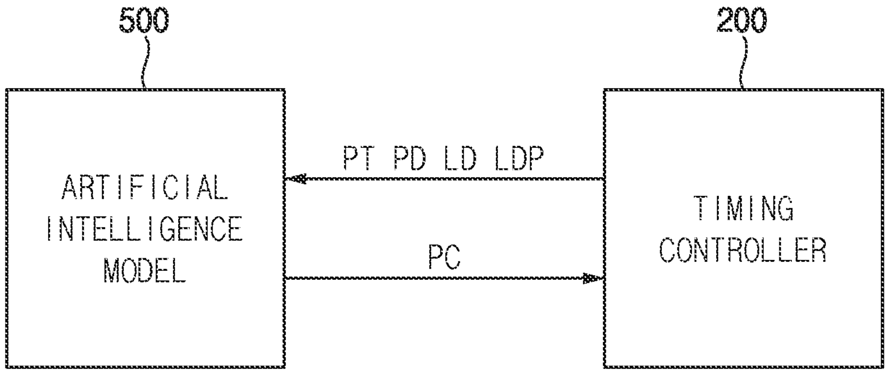
FIG. 11 is a block diagram showing an embodiment of a timing controller and an artificial intelligence model of a display device according to the disclosure.

FIG. 11 is a block diagram showing an embodiment of a timing controller 200 and an artificial intelligence model 500 of a display device according to the disclosure.

Since a display device in the illustrated embodiments has a configuration that is substantially identical to the configuration of the display device of FIG. 1 except that a temperature PT of the display panel 100 and a deterioration amount PD of the pixel P are received instead of the luminance efficiency LE, the same reference numerals and reference signs will be used for the same or similar components, and redundant descriptions will be omitted.

Referring to FIGS. 1 and 11, an artificial intelligence model 500 may receive a temperature PT of the display panel 100, a deterioration amount PD of the pixel P, a load LD of the input image data IMG in each of panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate the prediction current PC, and output the prediction current PC to the timing controller 200. The timing controller 200 may control a luminance based on the prediction current PC.

The artificial intelligence model 500 may be a model trained from measurement values of the power current EL according to the temperature PT of the display panel 100, the deterioration amount PD of the pixel P, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD.

Figure 12:
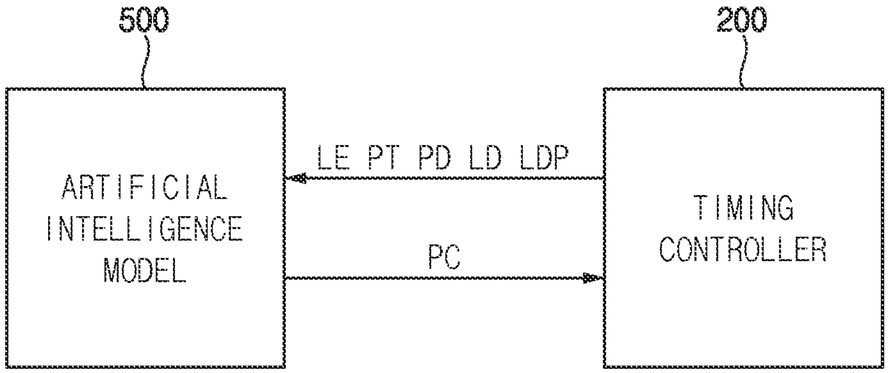
FIG. 12 is a block diagram showing an embodiment of a timing controller and an artificial intelligence model of a display device according to the disclosure.

FIG. 12 is a block diagram showing an embodiment of a timing controller 200 and an artificial intelligence model 500 of a display device according to the disclosure.

Since a display device in the illustrated embodiments has a configuration that is substantially identical to the configuration of the display device of FIG. 1 except that a temperature PT of the display panel 100 and a deterioration amount PD of the pixel P are received, the same reference numerals and reference signs will be used for the same or similar components, and redundant descriptions will be omitted.

Referring to FIGS. 1 and 12, an artificial intelligence model 500 may receive luminance efficiency LE for each of colors in each of panel blocks PB1, PB2, PB3, PB4, PB5, and PB6 of the display panel 100, a temperature PT of the display panel 100, a deterioration amount PD of the pixel P, a load LD of the input image data IMG in each of the panel blocks PB1, PB2, PB3, PB4, PB5, and PB6, and a position LDP of each of the panel blocks PB1, PB2, PB3, PB4, PB5, and PB6 corresponding to the load LD to predict the power current EL applied to the display panel 100. The artificial intelligence model 500 may predict the power current EL applied to the display panel 100 to generate the prediction current PC, and output the prediction current PC to the timing controller 200. The timing controller 200 may control a luminance based on the prediction current PC.

The artificial intelligence model 500 may be a model trained from measurement values of the power current EL according to the luminance efficiency LE for each of the colors in each of the panel blocks PB1, PB2, PB3, PB4, PB5, and PB6 of the display panel 100, the temperature PT of the display panel 100, the deterioration amount PD of the pixel P, the load LD of the input image data IMG in each of the panel blocks PB1, PB2, PB3, PB4, PB5, and PB6, and the position LDP of each of the panel blocks PB1, PB2, PB3, PB4, PB5, and PB6 corresponding to the load LD.

Figure 13:
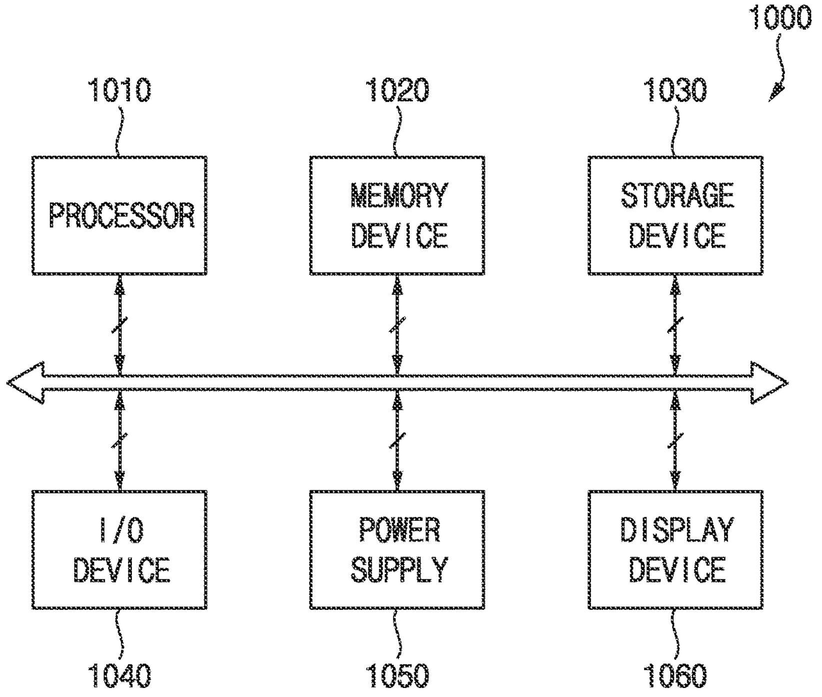
FIG. 13 is a block diagram showing an embodiment of an electronic device according to the disclosure.
Figure 14:
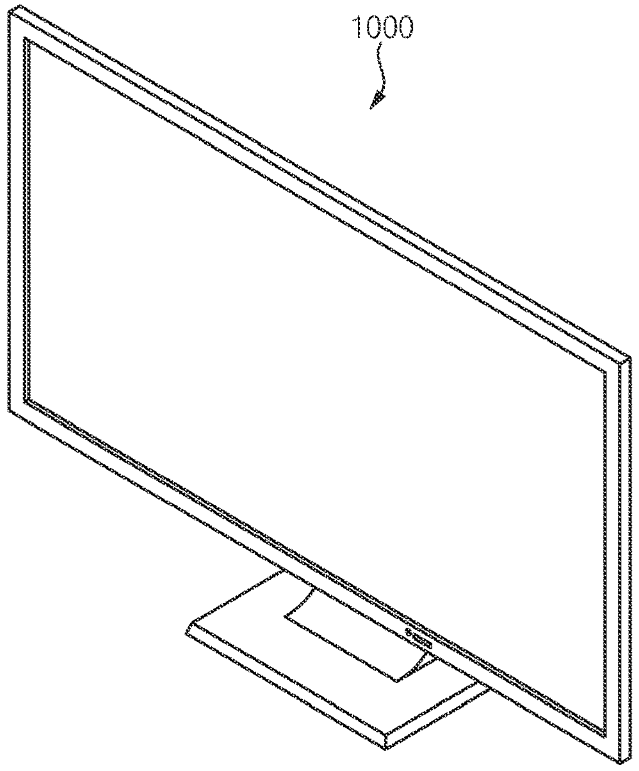
FIG. 14 is a diagram showing one example in which the electronic device of FIG. 13 is implemented as a television.

FIG. 13 is a block diagram showing an embodiment of an electronic device 1000 according to the present disclosure, and FIG. 14 is a diagram showing one example in which the electronic device of FIG. 13 is implemented as a television.

Referring to FIGS. 13 and 14, the electronic device 1000 may include a processor 1010, a memory device 1020, a storage device 1030, an input/output ("I/O") device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus ("USB") device, other electronic devices, etc. In an embodiment, as shown in FIG. 14, the electronic device 1000 may be implemented as a television. However, the electronic device 1000 is not limited thereto. In an embodiment, the electronic device 1000 may be implemented as a cellular phone, a video phone, a smart pad, a smart watch, a tablet personal computer, a car navigation system, a computer monitor, a laptop, a head disposed (e.g., mounted) display ("HMD") device, etc., for example.

The processor 1010 may perform various computing functions. The processor 1010 may be a micro processor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus.

The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc and/or at least one volatile memory device such as a dynamic random access memory ("DRAM") device, a static random access memory ("SRAM") device, a mobile DRAM device, etc., for example.

The storage device 1030 may include a solid state drive ("SSD") device, a hard disk drive ("HDD") device, a compact disc read-only memory ("CD-ROM") device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. In an embodiment, the power supply 1050 may be a power management integrated circuit ("PMIC"), for example.

The display device 1060 may display an image corresponding to visual information of the electronic device 1000. Here, the display device 1060 may be an organic light-emitting display device or a quantum-dot light-emitting display device. However, the display device 1060 is not limited thereto. The display device 1060 may be coupled to other components via the buses or other communication links. Here, the display device 1060 may predict a power current without a current sensor which senses the power current.

The disclosure may be applied to a display device and an electronic device including the display device. In an embodiment, the disclosure may be applied to a digital television, a three dimensional ("3D") television, a smart phone, a cellular phone, a personal computer, a tablet PC, a virtual reality ("VR") device, a home appliance, a laptop, a personal digital assistant ("PDA"), a portable media player ("PMP"), a digital camera, a music player, a portable game console, a car navigation system, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the disclosure. Accordingly, all such modifications are intended to be included within the scope of the disclosure as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A display device comprising:

a display panel including a pixel;

a data driver which provides a data voltage to the pixel;

an artificial intelligence model which receives luminance efficiency for each of colors in each of panel blocks of the display panel and predicts a power current applied to the display panel based on the luminance efficiency for each of the colors; and a timing controller which controls the data driver and provides the luminance efficiency for each of the colors to the artificial intelligence model.

2. The display device of claim 1, wherein the artificial intelligence model receives a load of input image data in each of the panel blocks and predicts the power current.

3. The display device of claim 2, wherein the artificial intelligence model receives a position of each of the panel blocks corresponding to the load and predicts the power current.

4. The display device of claim 1, wherein the artificial intelligence model receives a temperature of the display panel and predicts the power current.

5. The display device of claim 1, wherein the artificial intelligence model receives a deterioration amount of the pixel and predicts the power current.

6. The display device of claim 5, wherein the timing controller determines the deterioration amount of the pixel by sensing an electrical characteristic of the pixel.

7. The display device of claim 5, wherein the timing controller determines the deterioration amount of the pixel by comparing a sensing current in an initial sensing operation with a sensing current in a current sensing operation.

8. The display device of claim 5, wherein the deterioration amount of the pixel is updated.

9. A display device comprising: a display panel including a pixel; a data driver which provides a data voltage to the pixel; an artificial intelligence model which receives a load of input image data in each of panel blocks of the display panel and predicts a power current applied to the display panel based on the load of input image data in each of the panel blocks; and a timing controller which controls the data driver and provides the load of input image data to the artificial intelligence model.

10. The display device of claim 9, wherein the artificial intelligence model receives a position of each of the panel blocks corresponding to the load and predicts the power current.

11. The display device of claim 9, wherein the artificial intelligence model receives a deterioration amount of the pixel and predicts the power current.

12. The display device of claim 11, wherein the timing controller determine the deterioration amount of the pixel by sensing an electrical characteristic of the pixel.

13. The display device of claim 11, wherein the timing controller determine the deterioration amount of the pixel by comparing a sensing current in an initial sensing operation with a sensing current in a current sensing operation.

14. The display device of claim 11, wherein the deterioration amount of the pixel is updated.

15. A display device comprising:

a display panel including a pixel;

a data driver which provides a data voltage to the pixel;

an artificial intelligence model which receives a deterioration amount of the pixel and predicts a power current applied to the display panel based on the deterioration amount of the pixel; and a timing controller which controls the data driver and provides the deterioration amount of the pixel to the artificial intelligence model.

16. The display device of claim 15, wherein the timing controller determines the deterioration amount of the pixel by sensing an electrical characteristic of the pixel.

17. The display device of claim 15, wherein the timing controller determines the deterioration amount of the pixel by comparing a sensing current in an initial sensing operation with a sensing current in a current sensing operation.

18. The display device of claim 15, wherein the deterioration amount of the pixel is updated.

19. The display device of claim 15, wherein the artificial intelligence model receives a load of input image data in each of panel blocks of the display panel and a position of each of the panel blocks corresponding to the load and predicts the power current.

* * * * *